United States Patent [19]

Bogusch

[11] Patent Number: 4,705,633
[45] Date of Patent: Nov. 10, 1987

[54] NITRIFICATION WITH SLUDGE REAERATION AND AMMONIA ENRICHMENT

[76] Inventor: Eugene D. Bogusch, 1421 Bolson Dr., Downers Grove, Ill. 60516

[21] Appl. No.: 914,616

[22] Filed: Oct. 2, 1986

[51] Int. Cl.$^4$ ............................................. C02F 3/12
[52] U.S. Cl. .................................. 210/614; 210/625; 210/610; 210/903; 210/630
[58] Field of Search ............... 210/903, 614, 625, 610, 210/611, 96.1, 630

[56] References Cited

U.S. PATENT DOCUMENTS

| | | | |
|---|---|---|---|
| 2,562,510 | 7/1951 | Schlenz | 210/610 |
| 3,401,113 | 9/1968 | Pruessner et al. | 210/625 |
| 3,652,406 | 3/1972 | Westberg | 210/610 |
| 3,871,999 | 3/1975 | Torpey | 210/619 |
| 4,437,992 | 3/1984 | Saito et al. | 210/614 |

FOREIGN PATENT DOCUMENTS

| | | | |
|---|---|---|---|
| 58-14997 | 1/1983 | Japan | 210/614 |
| 58-45913 | 10/1983 | Japan | 210/614 |

Primary Examiner—Benoit Castel
Attorney, Agent, or Firm—A. G. Douvas

[57] ABSTRACT

A nitrification process is disclosed wherein the population of the nitrifying bacteria in an activated sludge system may be increased by the addition of ammonium nitrogen to a return sludge reaeration zone. The increased nitrifying population results in increased reliability of nitrification and lower effluent ammonium nitrogen concentrations.

8 Claims, 1 Drawing Figure

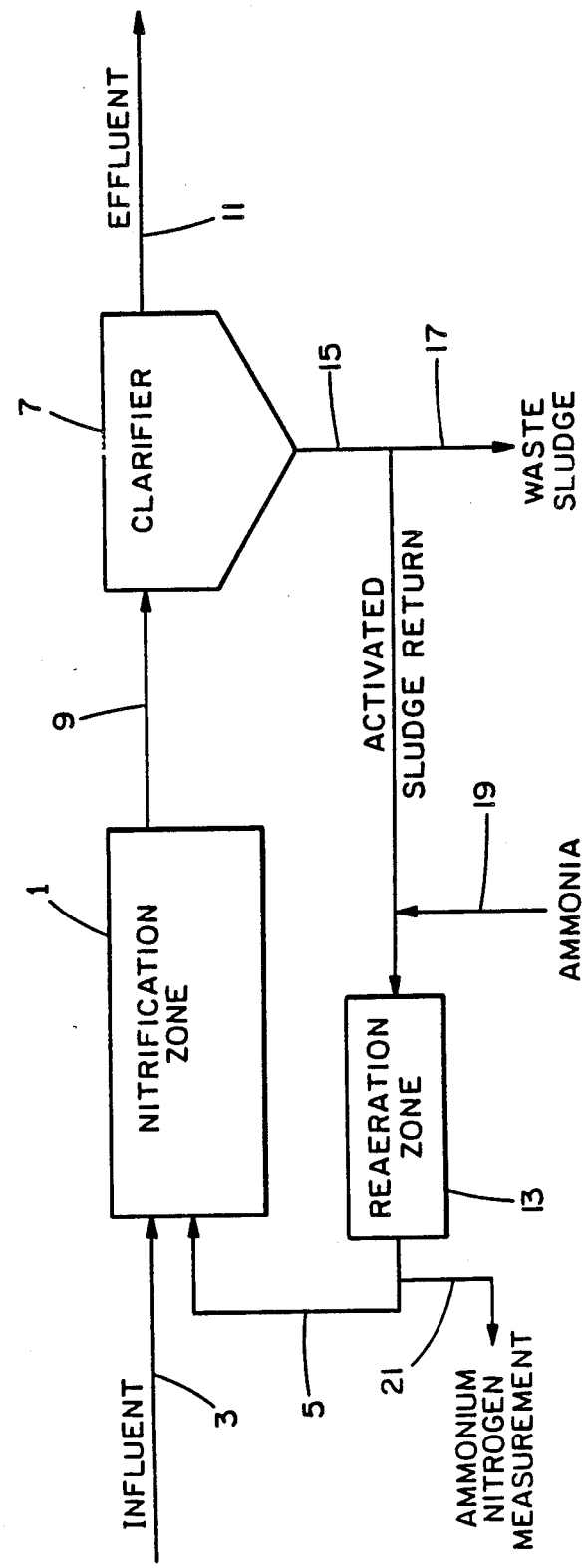

NITRIFICATION WITH SLUDGE REAERATION AND AMMONIA ENRICHMENT

FIELD OF INVENTION

This invention relates to a process to improve nitrification of wastewater in activated sludge systems.

BACKGROUND OF THE INVENTION

Ammonium nitrogen removal from wastewaters can often be accomplished by biological nitrification. Nitrification is the oxidation of ammonium nitrogen to nitrate nitrogen by nitrifying autotrophic bacteria. The activated sludge process is utilized to stabilize wastewater biologically under aerobic conditions. Generally, activated sludge systems can be adapted to achieve nitrification of wastewaters amenable to biological treatment.

Despite widespread application of nitrification in activated sludge systems, the process is often hampered by uncertain reliability due in part to the particular requirements for growth of the nitrifying bacteria. These requirements include appropriate pH levels and adequate dissolved oxygen concentrations. In addition, the low growth rate of the nitrifying bacteria constrain process reliability perhaps more than any other factor. The low growth rate is further depressed by decreased temperatures as experienced seasonally in northern climates. High wastewater flow and high ammonium nitrogen loadings, even as experienced in normal diurnal variations, can cause a decrease of nitrification efficiency. It is an object of this invention to improve nitrification in activated sludge systems, particularly during periods of stressed operation caused by low wastewater temperatures, high hydraulic loadings or high ammonium nitrogen loadings.

Nitrifying activated sludge systems pose the problem of high capital cost as compared to conventional activated sludge plants because they generally require substantially more aeration volume. In combined carbon oxidation-nitrification systems longer solids retention times and hydraulic retention times must be maintained necessitating increased aeration volume. In two-stage systems having separate carbonaceous removal and nitrification, the requirements for aeration and clarifier volumes may be even greater. Another object of this invention is to reduce the aeration volume usually required for a nitrifying activated sludge system.

SUMMARY OF INVENTION

This invention increases the efficiency of nitrification by increasing the population of nitrifying bacteria beyond that which would naturally occur in a nitrifying activated sludge system. The activated sludge system utilized in the process of this invention comprises a nitrification zone, a clarifier and a return sludge reaeration zone. The reaeration zone is enriched with anhydrous ammonia or an aqueous solution of anhydrous ammonia to achieve the increase in the nitrifying population.

Since ammonium ions are soluble, the ammonium nitrogen concentration in the return sludge will be very low whenever substantial nitrification occurs in the nitrification zone. Therefore, the reaeration zone will have a large nitrification capacity which is utilized to assimilate the ammonia added in the enrichment process. Nitrification of the supplemental ammonium nitrogen will cause increased alkalinity consumption which may necessitate pH control within the sludge reaeration zone between a pH of about 6 to 9.

The activated sludge leaving the reaeration zone is monitored for ammonium nitrogen to ascertain that the supplemental ammonia loading to the reaeration zone has not exceeded its nitrification capacity. Any bleed-through of the supplemental ammonium nitrogen in the return activated sludge influent to the nitrification zone will increase the total ammonium nitrogen loading to the nitrification zone. An increase of the ammonium nitrogen loading to the nitrification zone can result in a loss of nitrification efficiency of the wastewater, particularly during periods of stressed operation. Therefore, the addition of the supplemental ammonia must be adjusted accordingly to prevent any significant bleed-through of ammonium nitrogen from the reaeration zone to the nitrification zone. Further objects and advantages of my invention will become apparent from consideration of the drawing and ensuing description.

BRIEF DESCRIPTION OF THE DRAWING

The FIGURE is a schematic diagram of a nitrifying activated sludge system illustrating one embodiment of the process of this invention.

DESCRIPTION OF THE PREFERRED EMBODIMENTS

The FIGURE shows a typical example of the process of this invention deployed in a nitrifying activated sludge system. However, the scope of this invention is not limited to this example. In the example shown in the FIGURE the wastewater is introduced to the nitrification zone 1 through conduit 3. The wastewater may have undergone preliminary treatment such as screening, grit removal and primary sedimentation. The nitrification zone 1 will ordinarily be either a plug flow or completely mixed aeration tank in a combined carbon oxidation-nitrification system. The nitrifying activated sludge system may be integrated with other compatible treatment steps such as anoxic denitrification.

Recyled activated sludge is introduced to the nitrification zone 1 by way of conduit 5 and mixed with the influent wastewater. After aeration in the nitrification zone 1 the mixed liquor is directed to the clarifier 7 by way of conduit 9. The clarified wastewater leaves the clarifier 7 by way of conduit 11 and is directed to subsequent treatment processes, if any. The sedimented activated sludge is directed to the sludge reaeration zone 13 by way of conduit 15. The sludge reaeration zone 13 may be either a plug flow or completely mixed aeration tank. Normally the reaeration zone 13 will comprise only about 5 to 20 percent of the total aeration volume since it is preferable to have the majority of the activated sludge in the nitrification zone 1 where it is in active contact with the wastewater. Excess sludge is removed from the system as required through conduit 17. In the example shown in the FIGURE, anhydrous ammonia is utilized as the source of the supplemental ammonium nitrogen. The ammonia is added to the return sludge prior to its introduction to the sludge reaeration zone 13 through conduit 19. The ammonia may also have been added at the inlet of the reaeration zone 13.

While ammonium nitrogen addition is occurring the ammonium nitrogen concentration at the outlet 21 of the reaeration zone 13 should be monitored at regular intervals, perhaps every 1 to 4 hours. If the reaeration zone 13 is of complete mix design then the ammonium nitrogen concentration may be monitored at any location where uniform dispersion has occurred. To reduce biological activity and facilitate analysis, the suspended solids should be removed from the samples of the reaerated activated sludge by methods such as sedimentation, filtration or centrifugation. Suitable filter aids or coagulants may be utilized to expedite the solids separation. The ammonium nitrogen concentration is then measured, preferably by the ammonia-selective electrode method. The electrode method is rapid, simple and can be performed at convenient field locations. If the ammonium nitrogen concentration of the reaerated activated sludge increases beyond a predetermined acceptable level of perhaps about b 2 mg/l then the ammonium nitrogen addition should be reduced accordingly or discontinued altogether so that nitrification efficiency in the nitrification zone 1 is not adversely affected. On a daily basis the ammonium nitrogen addition may be discontinued after a target amount has been added.

Granted a low ammonium nitrogen concentration in the reaerated activated sludge, ammonium nitrogen can be added to the reaeration zone 13 at a constant rate with respect to time. When the ammonium nitrogen dosage remains constant with respect to time, the supplemental ammonium nitrogen concentration in the return sludge influent to the reaeration zone 13 is inversely related to the return sludge flow. The dosage utilized will depend on the increase of the nitrifying population desired. The goal for population increase may range from about 5 to 50%. The fraction of activated sludge within the reaeration zone 13 will not fluctuate significantly at a uniform return sludge rate based upon percent of wastewater flow. Therefore, for a given nitrifying population, the ammonium nitrogen utilization capacity within the sludge reaeration zone 13 should remain fairly constant.

The preferred source of supplemental ammonium nitrogen is anhydrous ammonia. Ammonia is extremely soluble in water and is rapidly ionized to ammonium nitrogen at the near neutral pH of most wastewaters. The alkalinity of an ionized ammonia solution will help to reduce the acidity produced from the nitrification process. Ammonia may be utilized in either its gaseous or liquified states, or in a concentrated aqueous solution. Compared to alternate sources of ammonium nitrogen such as ammonium salts, anhydrous ammonia offers the advantages of low cost, widespread availability, highest ammonia content, ease of use and compact storage.

Since nitrification produces acidity, pH control may be required for wastewaters with insufficient alkalinity. The ammonium nitrogen enrichment may require pH control within the sludge reaeration zone 13. Lime is generally the chemical of choice for pH and alkalinity control.

AN EXAMPLE

The following example depicts a conventional activated sludge plant adapted to the nitrification process of this invention. A plant has the following characteristics:
Average flow—10 million gallons per day
Aeration zone volume—3.75 million gallons
Average sludge return rate—50% of wastewater flow
Average aeration zone hydraulic retention time—6 hours
Solids retention time—6 days
Average ammonium nitrogen concentration of influent wastewater—12 mg/l A return sludge reaeration zone 13 is constructed having a volume of 417,000 gallons which is one-ninth of the existing mixed liquor aeration volume. The return sludge reaeration zone 13 will have an average hydraulic retention time of 2 hours. At a 50% return rate the sludge reareation zone 13 will hold about 25% of the activated sludge in the system assuming a negligible amount of sludge is present in the clarifier 7. At this return rate the return sludge will have a suspended solids concentration approximately three times that of the mixed liquor.

The introduction of the sludge reaeration zone 13 will cause an increase in the solids retention time to at least 8 days if the same mixed liquor concentration is maintained. Since sludge yield is reduced at higher solids retention times due to endogenous respiration, the actual solids retention time achieved will be even greater, probably about 9 days. A solids retention time of approximately 9 days is generally capable of supporting a much larger nitrifying population than the initial 6 day solids retention time. Some of this advantage is lost since the activated sludge in the sludge reaeration zone 13 is not in active contact with the wastewater. In general, the net effect of the sludge reaeration zone 13 will be to increase nitrification efficiency for plants initially having solids retention times of less than about 10 days. This is particularly true if the plant has not achieved or substantially exceeded the minimum solids retention time necessary to support nitrification.

In the example given, the nitrifying population can be increased one-third over that occurring after the addition of the sludge reaeration zone 13 by adding anhydrous ammonia to the reaeration zone 13 at a constant rate of 16.9 pounds per hour. This addition of anhydrous ammonia results in an average dosage of 8 mg/l as ammonium nitrogen in the return sludge and a total ammonia usage of 405 pounds per day.

The enrichment process may be maintained at a low level or even discontinued entirely during periods of nearly complete nitrification. Prior to and during anticipated periods of stressed operation such as periods of low wastewater temperatures, the process may be utilized to maintain high nitrification efficiency. Continuous use will be effective in preventing or minimizing upsets in the nitrification process attributable to an inadequate nitrifying population. It should be understood that this process will not be very effective in preventing upsets due to inadequate dissolved oxygen levels, inhibiting pH levels or substances inhibiting or toxic to nitrifying bacteria.

It should be clear that during periods of faltering nitrification efficiency as for example during periods of high flow and high ammonium nitrogen loading, the amount of supplemental ammonium nitrogen added to the sludge reaeration zone 13 may need to be reduced in order to maintain effluent ammonium nitrogen concentrations from the sludge reaeration zone 13 at less than the predetermined level. Nitrification of any residual ammonium nitrogen recycled with the return sludge in the sludge reaeration zone 13 can cause the initial ammonium nitrogen concentrations of the mixed liquor in the nitrification zone 1 to be reduced significantly over levels which would exist if no sludge reaeration zone 13 where present in the system. Even during the periods of less efficient nitrification, diurnal changes in flow and nitrogen loading will usually permit supplemental ammonium nitrogen addition during a significant portion of the day.

In the foregoing description the process of this invention has been described with reference to certain particular preferred embodiments, though it is to be understood that the specific details shown are merely illustrative and that the process of this invention may be carried out in other ways without departing from the true spirit and scope of the appended claims.

What is claimed is:

1. In an activated sludge process for the nitrification of wastewater including a nitrification zone through which the wastewater is continuously passed while being aerated in the presence of activated sludge, a clarifier in which the nitrified wastewater from the nitrification zone is clarified, and a reaeration zone in which separated activated sludge from the clarifier is aerated at a pH of about 6 to 9 before being recycled back into the nitrification zone, the improvement for controlled enrichment of the reaeration zone with ammonium nitrogen, comprising:
   (a) a step of measuring the ammonium nitrogen concentration in the activated sludge at an outlet of the reaeration zone feeding into the nitrification zone, and
   (b) a step of adding an ammonium nitrogen enriching agent consisting essentially of anhydrous ammonia to an inlet of the reaeration zone at a controlled rate restricted by the ammonium nitrogen measurement whereby the ammonium nitrogen concentration found at an outlet of the reaeration zone feeding into the nitrification zone is maintained below a predetermined level of about 2 mg/l so as not to adversely affect the nitrification efficiency of the nitrification zone.

2. The process of claim 1 wherein on a daily basis, the ammonium nitrogen enrichment is discontinued after a predetermined amount of ammonium nitrogen has been added to the reaeration zone.

3. The process of claim 1 wherein the ammonium nitrogen enrichment is made into the separated activated sludge from the clarifier before entry into said reaeration zone.

4. The process of claim 1 wherein the ammonium nitrogen concentration of the activated sludge is measured by the ammonia-selective electrode method, after a physical separation of the suspended solids in a sample of the activated sludge has been made.

5. In an activated sludge process for the nitrification of wastewater including a nitrification zone through which the wastewater is continuously passed while being aerated in the presence of activated sludge, a clarifier in which the nitrified wastewater from the nitrification zone is clarified, and a reaeration zone in which separated activated sludge from the clarifier is aerated at a pH of about 6 to 9 before being recycled back into the nitrification zone, the improvement for controlled enrichment of the reaeration zone with ammonium nitrogen, comprising:
   (a) a step of measuring ammonium nitrogen in the activated sludge at an outlet of the reaeration zone feeding into the nitrification zone, and
   (b) a step of adding an ammonium nitrogen enriching agent consisting essentially of an aqueous ammonium solution derived from anhydrous ammonia to an inlet of the reaeration zone at a controlled rate restricted by the ammonium nitrogen measurement whereby the ammonium nitrogen concentration found at an outlet of the reaeration zone feeding into the nitrification zone is maintained below a predetermined level of about 2 mg/l so as not to adversely affect the nitrification efficiency of the nitrification zone.

6. The process of claim 5 wherein on a daily basis, the ammonium nitrogen enrichment is discontinued after a predetermined amount of ammonium nitrogen has been added to the reaeration zone.

7. The process of claim 5 wherein the ammonium nitrogen enrichment is made into the separated activated sludge from the clarifier before entry into said reaeration zone.

8. The process of claim 5 wherein the ammonium nitrogen concentration of the activated sludge is measured by the ammonia-selective electrode method, after a physical separation of the suspended solids in a sample of the activated sludge has been made.

* * * * *